US011897711B2

(12) United States Patent
Kurita et al.

(10) Patent No.: US 11,897,711 B2
(45) Date of Patent: Feb. 13, 2024

(54) SHEET CONVEYING DEVICE

(71) Applicant: TOSHIBA TEC KABUSHIKI KAISHA, Tokyo (JP)

(72) Inventors: Eizo Kurita, Sunto Shizuoka (JP); Naofumi Soga, Sunto Shizuoka (JP); Kenji Takashima, Numazu Shizuoka (JP); Toshiaki Oshiro, Izu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 179 days.

(21) Appl. No.: 17/671,511

(22) Filed: Feb. 14, 2022

(65) Prior Publication Data

US 2022/0332529 A1 Oct. 20, 2022

(30) Foreign Application Priority Data

Apr. 16, 2021 (JP) ................................ 2021-069772

(51) Int. Cl.

*B65H 1/14* (2006.01)
*G03G 15/00* (2006.01)
*B65H 3/06* (2006.01)

(52) U.S. Cl.

CPC ................ *B65H 1/14* (2013.01); *B65H 3/06* (2013.01); *G03G 15/6529* (2013.01); *B65H 2403/514* (2013.01); *B65H 2405/10* (2013.01)

(58) Field of Classification Search

CPC ...... B65H 1/14; B65H 3/06; B65H 2403/514; B65H 2405/10

USPC .................................................. 271/160, 162

See application file for complete search history.

(56) References Cited

U.S. PATENT DOCUMENTS 5,358,230 A * 10/1994 Ikemori ............... B65H 3/0669 271/118
5,863,036 A * 1/1999 Tanaka ................ B65H 3/5223 271/127
5,984,297 A * 11/1999 Tanaka ..................... B65H 3/34 271/118
6,000,689 A * 12/1999 Furuki ................ B65H 3/0669 271/127
6,095,515 A * 8/2000 Kiyohara ............... B65H 3/565 271/170
7,481,423 B2 * 1/2009 Lim ..................... B65H 3/5223 271/118
7,510,180 B2 * 3/2009 Jang ..................... B65H 3/0638 271/157
7,712,736 B2 * 5/2010 Chinzei ................ B65H 3/0638 271/157

(Continued)

FOREIGN PATENT DOCUMENTS

JP H07-302032 A 11/1995
JP 2007-070044 A 3/2007

*Primary Examiner* — Leslie A Nicholson, III

(74) *Attorney, Agent, or Firm* — Kim & Stewart LLP

(57) ABSTRACT

A sheet conveying device includes a sheet tray on which one or more sheets are placed, a pickup roller by which a sheet is picked up from the sheet tray, and an elevating mechanism. The elevating mechanism includes a shaft rotated by a motor, and a cam attached to the shaft and rotated together with the shaft to raise and lower the sheet tray with respect to the pickup roller. The sheet conveying device further includes a load applying mechanism contacting the shaft to apply a load thereto.

20 Claims, 11 Drawing Sheets

(56) References Cited

U.S. PATENT DOCUMENTS

| | | | | |
|---|---|---|---|---|
| 8,616,545 | B2 * | 12/2013 | Takiguchi | B65H 3/0607 271/118 |
| 8,733,754 | B2 * | 5/2014 | Mizuno | B65H 5/06 271/10.04 |
| 9,725,260 | B2 * | 8/2017 | Furusawa | B65H 3/0607 |
| 11,209,764 | B2 * | 12/2021 | Oshiro | G03G 15/6558 |
| 2016/0327897 | A1 | 11/2016 | Kondo | |
| 2020/0073317 | A1 | 3/2020 | Uchida | |

* cited by examiner

SHEET CONVEYING DEVICE

CROSS-REFERENCE TO RELATED APPLICATIONS

This application is based upon and claims the benefit of priority from Japanese Patent Application No. 2021-069772, filed on Apr. 16, 2021, the entire contents of which are incorporated herein by reference.

FIELD

Embodiments described herein relate generally to a sheet conveying device.

BACKGROUND

A sheet conveying device includes a sheet tray, a motor, and an elevating mechanism. The elevating mechanism raises and lowers the sheet tray by driving the motor. The sheet tray is required to stop at appropriate positions during the motor operation. The load applied to the motor when the sheet tray is being raised or lowered varies depending on the weight of sheets on the sheet tray. When the rotation speed of the motor varies due to the sheet load, there is a possibility the sheet tray will be stopped at an inappropriate position.

DETAILED DESCRIPTION

In general, according to one embodiment, a sheet conveying device includes a sheet tray on which one or more sheets are placed, a pickup roller by which a sheet is picked up from the sheet tray, and an elevating mechanism. The elevating mechanism includes a shaft rotated by a motor, and a cam attached to the shaft and rotated together with the shaft to raise and lower the sheet tray with respect to the pickup roller. The sheet conveying device further includes a load applying mechanism contacting the shaft to apply a load thereto.

Hereinafter, a sheet conveying apparatus according to a first embodiment will be described with reference to the drawings. First, an image forming apparatus 100 equipped with a sheet conveying device 30 will be described.

Figure 1:
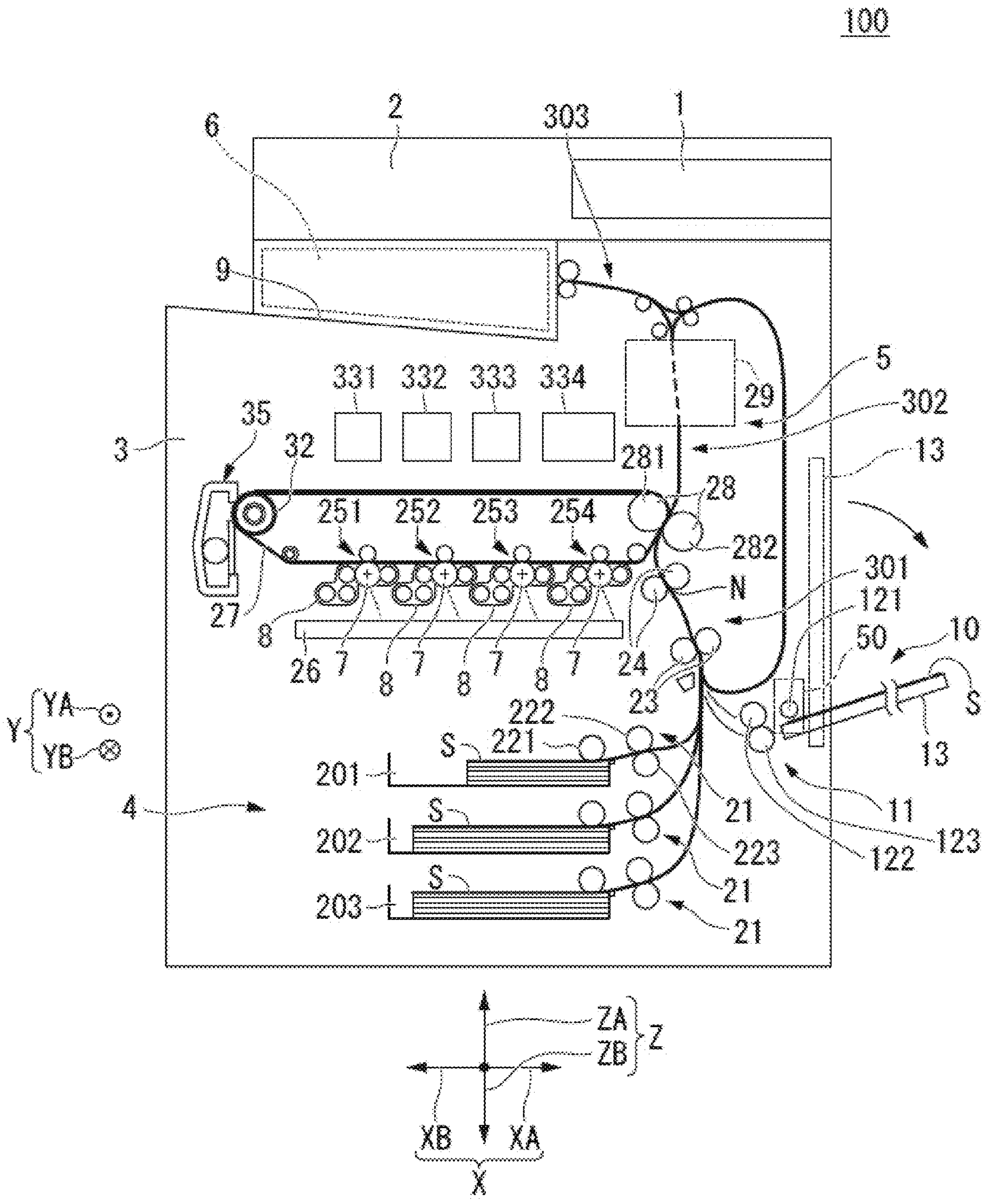
FIG. 1 is a schematic diagram of an image forming apparatus according to a first embodiment.

FIG. 1 is a schematic diagram of the image forming apparatus 100 according to a first embodiment. As illustrated in FIG. 1, the image forming apparatus 100 includes a control panel 1, a scanner unit 2, a printer unit 3, a sheet feed unit 4, a conveying unit 5, a manual feed unit 10, and a control unit 6. The image forming apparatus 100 forms an image on a sheet-like recording medium such as paper (hereinafter, referred to as a "sheet").

Hereinafter, positions of components in the image forming apparatus 100 are explained using an XA direction, an XB direction, a YA direction, a YB direction, a ZA direction, and a ZB direction as corresponding to those illustrated in the drawings. The XA direction is a direction from left to right when viewed from the front side of the image forming apparatus 100 (front side of the paper surface of FIG. 1). The XB direction is a direction opposite to the XA direction. The YA direction is a direction from the backside to the front side of the image forming apparatus 100. The YB direction is opposite to the YA direction. The ZA direction is a vertically upward direction from the bottom to the top of the image forming apparatus 100. The ZB direction is a vertically downward direction opposite to the ZA direction. The XA, (YA, ZA) direction, the XB (YB, ZB) direction, or both directions are simply referred to as the X (Y, Z) direction. Hereinafter, a plane orthogonal to the X direction is referred to as a YZ plane, a plane orthogonal to the Y direction is referred to as a ZX plane, and a plane orthogonal to the Z direction is referred to as a XY plane. The ZX plane is parallel to a conveyance direction of a sheet S in the image forming apparatus 100. The XY plane is a horizontal plane.

The control panel 1 receives inputs from a user. The scanner unit 2 scans an object such as a document and reads image information thereof. The scanner unit 2 outputs the read image information to the printer unit 3.

The printer unit 3 forms an image on a sheet S based on the image information from the scanner unit 2 or an external device. The printer unit 3 forms an output image (e.g., a toner image) using a developer containing toner. The printer unit 3 transfers the toner image onto the surface of the sheet S. The printer unit 3 applies heat and pressure to the toner image on the surface of the sheet S to fix the toner image to the sheet S.

The sheet feed unit 4 supplies sheets S one by one to the printer unit 3 in accordance with a timing at which the printer unit 3 forms the toner image. The sheet feed unit 4 includes sheet feed cassettes 201, 202, 203 and cassette sheet feed units 21. The sheet feed cassettes 201, 202, 203 can store sheets S of different sizes. Each of the cassette sheet feed units 21 is disposed above the end portion of a corresponding one of the sheet feed cassette 201, 202, 203 in the XA direction. Each cassette sheet feed unit 21 includes a pickup roller 221, a sheet feeding roller 222, and a separation roller 223.

Each of the pickup rollers 221 conveys a sheet S for image formation from a corresponding one of the sheet feed cassettes 201, 202, 203 to a nip portion formed between the sheet feeding roller 222 and the separation roller 223. Each sheet feeding roller 222 conveys the sheet S from the nip portion to the conveying unit 5. Each separation roller 223 separates one sheet S when a plurality of sheets S are conveyed.

The conveying unit 5 includes conveying rollers 23 and registration rollers 24. The conveying unit 5 conveys the sheet S supplied from the sheet feed unit 4 to the registration rollers 24. The registration rollers 24 convey the sheet S in accordance with the timing at which the printer unit 3 transfers the toner image onto the sheet S.

The conveying rollers 23 push the leading end of the sheet S in the conveyance direction against the nip N of the registration rollers 24. The conveying rollers 23 adjust the position of the leading end of the sheet S in the conveyance direction by bending the sheet S. The registration rollers 24 align the leading end of the sheet S fed from the conveying roller 23 at the nip N. The registration rollers 24 convey the sheet S towards a transfer unit 28. The conveying unit 5 has conveyance paths 301, 302, and 303.

The printer unit 3 includes image forming units 251, 252, 253, and 254, an exposure unit 26, an intermediate transfer belt 27, a transfer unit 28, a fixing unit 29, and a transfer belt cleaning unit 35.

The image forming units 251, 252, 253, and 254 are arranged in this order in the XA direction. Each of the image forming units 251, 252, 253, and 254 forms a toner image (to be transferred to the sheet S) on the intermediate transfer belt 27. Each of the image forming units 251, 252, 253, 254 has a photosensitive drum 7. The image forming units 251, 252, 253, 254 respectively form toner images of yellow, magenta, cyan, and black color on the respective photosensitive drums 7.

Around each photosensitive drum 7, an electrostatic charger, a developing device 8, a primary transfer roller, a cleaning unit, and a static eliminator are disposed. The primary transfer roller faces the photosensitive drum 7. The intermediate transfer belt 27 is sandwiched between the primary transfer roller and the photosensitive drum 7. The exposure unit 26 is disposed below the electrostatic charger and the developing device 8.

Toner cartridges 331, 332, 333, and 334 are disposed above the image forming units 251, 252, 253, and 254. The toner cartridges 331, 332, 333, and 334 contain yellow, magenta, cyan, and black toners, respectively. The toners of the toner cartridges 331, 332, 333, and 334 are supplied to the image forming units 251, 252, 253, and 254 through toner supply tubes.

The exposure unit 26 irradiates the charged surface of each photosensitive drum 7 with laser light. Emission of the laser light is controlled based on image information. The exposure unit 26 may emit LED light instead of laser light. In the example illustrated in FIG. 1, the exposure unit 26 is disposed below the image forming units 251, 252, 253, and 254. Image information corresponding to yellow, magenta, cyan, and black is supplied to the exposure unit 26. The exposure unit 26 forms an electrostatic latent image based on the image information on the surface of each photosensitive drum 7.

The intermediate transfer belt 27 is an endless belt or loop. Tension is applied to the intermediate transfer belt 27 by a plurality of rollers brought into contact with the inner peripheral surface of the intermediate transfer belt 27. The intermediate transfer belt 27 is stretched flat along the X direction. The inner peripheral surface of the intermediate transfer belt 27 is in contact with a support roller 281 at the end of the intermediate transfer belt 27 in the XA direction. The inner peripheral surface of the intermediate transfer belt 27 is in contact with the transfer belt roller 32 at the end of the intermediate transfer belt 27 in the XB direction. The support roller 281 is a part of the transfer unit 28. The support roller 281 guides the intermediate transfer belt 27 to the secondary transfer position. The transfer belt roller 32 guides the intermediate transfer belt 27 to a cleaning position.

The image forming units 251, 252, 253, 254 (other than corresponding the primary transfer rollers) are disposed on the lower surface side of the intermediate transfer belt 27 in the drawing in this order in the XA direction. The image forming units 251, 252, 253, 254 are disposed between the transfer belt roller 32 and the support roller 281 so as to be spaced apart from each other. When the toner image reaches the primary transfer position, a transfer bias is applied to each primary transfer roller of the image forming units 251, 252, 253, and 254. Each primary transfer roller primarily transfers the toner image on the surface of the corresponding photosensitive drum 7 onto the intermediate transfer belt 27.

The transfer unit 28 is disposed adjacent to the image forming unit 254. The transfer unit 28 includes a support roller 281 and a secondary transfer roller 282. The secondary transfer roller 282 and the support roller 281 sandwich the intermediate transfer belt 27 therebetween. A position where the secondary transfer roller 282 and the intermediate transfer belt 27 are in contact with each other is a secondary transfer position. The transfer unit 28 transfers the charged toner image on the intermediate transfer belt 27 onto the surface of the sheet S at the secondary transfer position. The transfer unit 28 applies a transfer bias to the secondary transfer position. The transfer unit 28 transfers the toner image on the intermediate transfer belt 27 to the sheet S by the transfer bias.

The fixing device 29 applies heat and pressure to the sheet S. The fixing device 29 fixes the toner image transferred to the sheet S by heat and pressure. The fixing unit 29 is disposed above the transfer unit 28. The transfer belt cleaning unit 35 faces the transfer belt roller 32. The transfer belt cleaning unit 35 and the transfer belt roller 32 sandwich the intermediate transfer belt 27. The transfer belt cleaning unit 35 scrapes off toner on the surface of the intermediate transfer belt 27.

The conveyance paths 301 and 302 for conveying the sheet S from the lower side to the upper side are formed in this order between the conveying rollers 23 and the transfer unit 28 and between the transfer unit 28 and the fixing device 29, respectively. Each conveyance path 301, 302, and 303 has conveyance guide portions facing each other with the sheet S interposed therebetween, and conveying rollers provided as necessary.

The manual feed unit 10 supplies a sheet S on which an image is to be formed to the printer unit 3. The manual feed unit 10 includes a manual feed section 11, a manual feed tray 13 (or a sheet tray), and an elevating mechanism 50. The manual feed tray 13 is rotatable about an axis extending in the Y direction. When the manual feed tray 13 is used, as indicated by a solid line, the manual feed tray 13 is rotated clockwise to open. Sheets S of various sizes can be placed on the opened manual feed tray 13. When the manual feed tray 13 is not used, as indicated by a two-dot chain line, the manual feed tray 13 is rotated counterclockwise in the drawing and stored in a side portion of the printer unit 3 in the XA direction.

The manual sheet feed unit 11 separates and feeds a sheet S placed on a manual feed tray 13, and conveys the sheet S toward the registration rollers 24. The manual feed unit 11 includes a pickup roller 121, a sheet feeding roller 122, and a separation roller 123. The pickup roller 121 and the sheet feeding roller 122 in the manual feed unit 11 have the same configuration as the pickup roller 221 and the sheet feeding roller 222 in the cassette sheet feed unit 21. The separation roller 123 in the manual sheet feed unit 11 has the same configuration as that of the separation roller 223 in the cassette sheet feed unit 21 except that it is brought into contact with the sheet feeding roller 122.

Figure 2:
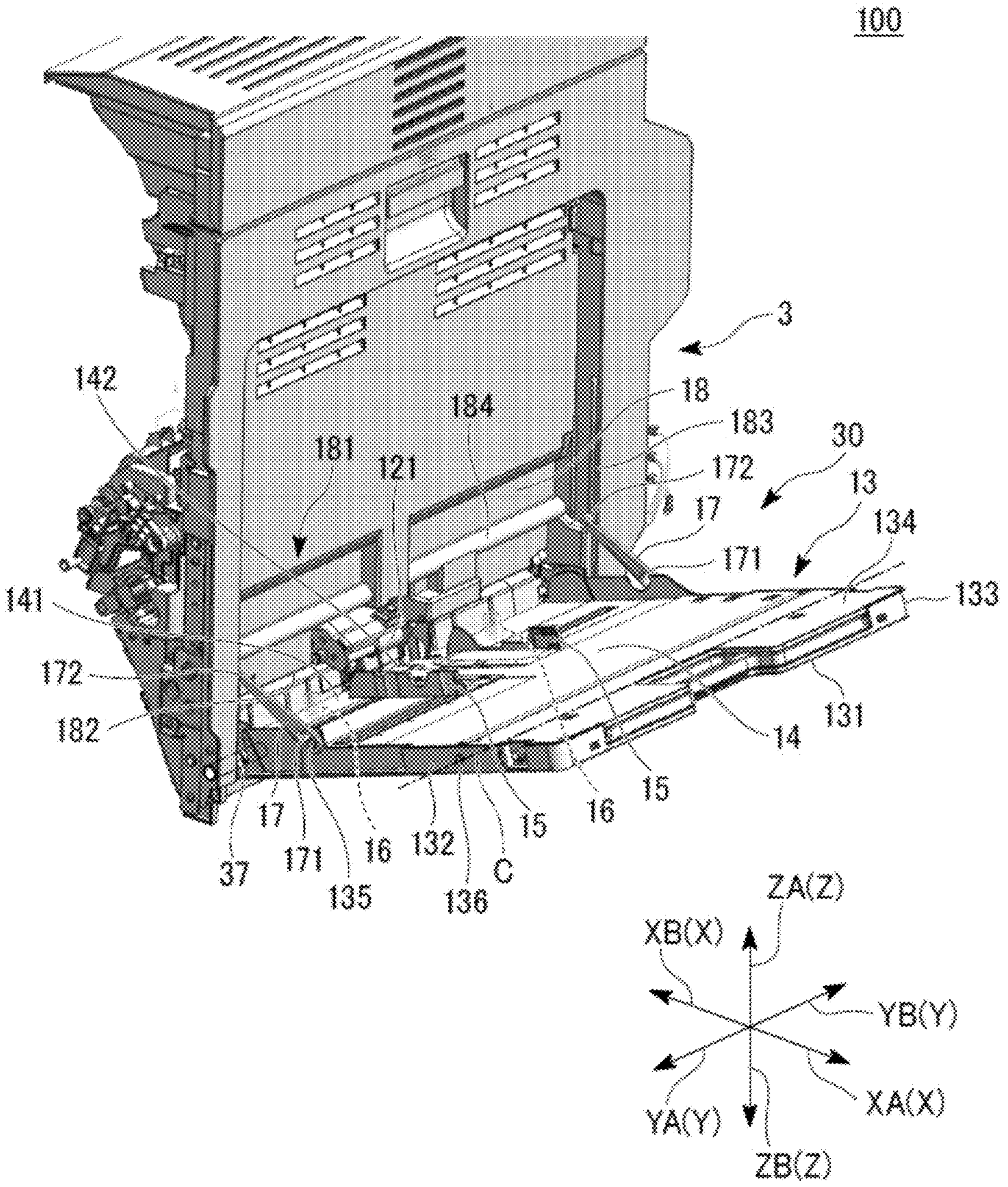
FIG. 2 is a perspective view of a sheet conveying device according to a first embodiment.
Figure 3:
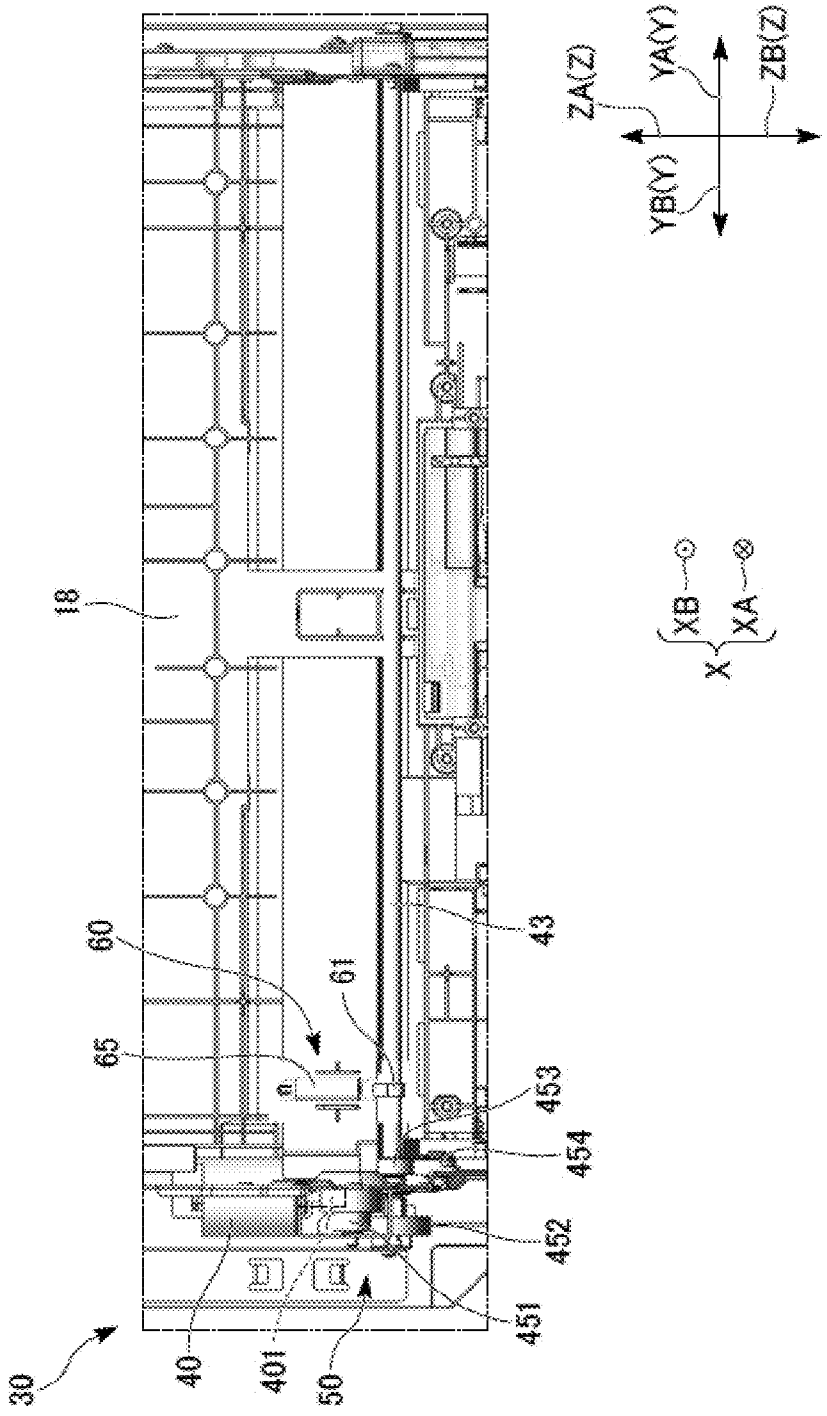
FIG. 3 is a front view of a sheet conveying device according to a first embodiment.

Next, the sheet conveying device will be described. FIG. 2 is a perspective view of the sheet conveying device 30 of the image forming apparatus 100 according to the first embodiment. FIG. 3 is a front view of the sheet conveying device 30 according to the first embodiment. I sheet conveying device 30 includes the manual feed tray 13 (see FIG. 2), a motor 40, the elevating mechanism 50, and a load applying mechanism 60. The components of the sheet conveying device 30 other than the manual feed tray 13 (see FIG. 2) are covered by a side cover 18.

The manual feed tray 13 has a size so as to be stored in the tray storage portion 181 of the side cover 18 covering the right side surface of the printer unit 3 of the image forming apparatus 100. The tray storage portion 181 is recessed in the XB direction from the surface of the side cover 18. The outer shape of the tray storage portion 181 viewed from the XB direction is a rectangular shape having substantially the same size as the manual feed tray 13. A sheet feed opening 182 through which the sheet S can pass is formed in a lower portion of the tray storage portion 181. The pickup roller 121 is provided at a central portion in the Y direction above the sheet feed opening 182.

A plurality of rotation support shafts 37 are provided near the lower end of the tray storage portion 181. Each of the rotation support shafts 37 protrudes from the inner surface of the tray storage portion 181 in the Y direction from the main body of the printer unit 3 covered by the side cover 18. However, in FIG. 2, only the rotation support shaft 37 protruding in the YB direction from the inner surface of the tray storage portion 181 is illustrated. Each rotation support shaft 37 extends coaxially with an axis extending in the Y direction. Each rotation support shaft 37 is fitted to a bearing portion 130 (see FIG. 4) of the manual feed tray 13. Thus, the manual feed tray 13 is rotatable about the rotation support shafts 37.

In the inner wall of the side cover 18, a plurality of guide grooves 183 extend in the Z direction. However, FIG. 2 shows only the guide groove 183 on the inner wall in the YB direction. A link 17 is engaged with each guide groove 183.

Each link 17 holds the manual feed tray 13 at a predetermined angle with respect to a horizontal plane (XY plane) in a state where the manual feed tray 13 is opened outward from the tray storage portion 181. Each link 17 extends outward from the corresponding guide groove 183 and is connected to one side surface of the manual feed tray 13 in the Y direction. A coupling hole 171 and a coupling pin 172 are provided at the respective ends of the link 17 in the longitudinal direction. A later-described attachment protrusion 135 of the manual feed tray 13 is inserted into the coupling hole 171 of each link 17. The coupling pin 172 of each link 17 is inserted into the corresponding guide groove 183 so as to be movable in the Z direction.

With this configuration, the manual feed tray 13 is rotatable between a closed state and an open state. The closed state is a state in which the manual feed tray 13 is stored inside the tray storage portion 181 along a vertical plane. The open state is a state in which the manual feed tray 13 is opened at a predetermined angle toward the outside of the tray storage portion 181 in the XA direction. Hereinafter, unless otherwise specified, the manual feed tray 13 in the open state will be described.

The manual feed tray 13 includes a bottom plate 131, a front side plate 132, a rear side plate 133, an upper plate 134, an elevating plate 14, a pair of guide fences 15, and a plurality of urging members 16. The bottom plate 131 forms a lower surface of the manual feed tray 13. In the closed state, the bottom plate 131 is substantially in the same plane as (flush with) the side cover 18. In the closed state, the bottom plate 131 forms apart of the right side surface of the image forming apparatus 100 together with the side cover 18.

The front side plate 132 protrudes upward from an end portion of the bottom plate 131 in the YA direction. The front side plate 132 includes the bearing portion 130 (see FIG. 4), the attachment protrusion 135, and a rotation support shaft 136. The bearing portion 130 supports the rotation support shaft 37 protruding in the YB direction from the inner surface of the tray storage portion 181 in the YA direction. The bearing portion 130 is formed in the vicinity of the end of the front side plate 132 in the XB direction. The attachment protrusion 135 is engaged with the coupling hole 171 of the link 17. The attachment protrusion 135 protrudes toward the YA direction at a position separated from the bearing portion 130 in the XA direction. The rotation support shaft 136 supports the elevating plate 14 so as to be rotatable around a central axis C of the rotation support shaft 136. The rotation support shaft 136 protrudes from the front side plate 132 in the YB direction.

The rear sideplate 133 protrudes upward from an end portion of the bottom plate 131 in the YB direction. The rear side plate 133 has a portion that is plane symmetrical with the front side plate 132, with the plane ZX, which contains the central axis line in the Y direction of the bottom plate 131, as the plane of symmetry. The rear side wall 133 includes the bearing portion 130, the attachment protrusion 135, and the rotation support shaft 136 provided in plane symmetry with the bearing portion 130, the attachment protrusion 135, and the rotation support shaft 136 of the front side plate 132.

The upper plate 134 covers, from above, the bottom plate 131 located in the XA direction with respect to the rotation support shafts 136. The upper plate 134 is disposed at the same height as the upper ends of the front side plate 132 and the rear side plate 133. The upper plate 134 forms a placement surface on which the sheet S is placed.

The elevating plate 14 forms a placement surface on which the sheet S is placed together with the upper plate 134. The elevating plate 14 is disposed on the inner side in the Y direction of each of the front side plate 132 and the rear side plate 133 from the end in the XB direction of the upper plate 134 to the end in the XB direction of the bottom plate 131. The elevating plate 14 has a substantially rectangular outer shape when viewed from above.

An end placement surface 141 that is long in the Y direction is formed at an end portion of the elevating plate 14 in the XB direction. A friction pad 142 that increases a frictional force acting on the sheet S is disposed at a central portion in the Y direction on the front side of the end placement surface 141. The friction pad 142 is provided at a position where it can abut the pickup roller 121. The friction pad 142 suppresses multi-feeding of the lowermost sheet S placed on the manual feed tray 13.

An end portion of the elevating plate 14 in the XA direction is rotatably supported by each rotation support shaft 136. In the elevating plate 14, the urging members 16 are disposed between the back side of the end placement surface 141 and the bottom plate 131.

Each urging member 16 has an urging force that pushes up the elevating plate 14 in a direction in which the elevating plate 14 is separated from the bottom plate 131. For example, the urging member 16 may include a spring and an elastic member. In the present embodiment, a compression coil spring is provided as the urging member 16. The urging members 16 are disposed on both sides in the Y direction below the end placement surface 141. The urging force of each urging member 16 has such a magnitude that the uppermost sheet S comes into contact with the pickup roller 121 when the sheets S are stacked on the elevating plate 14. The urging force of the urging member 16 is large enough to generate a frictional force to feed the uppermost sheet S that comes into contact with the pickup roller 121.

The pair of guide fences 15 are provided in a region of the elevating plate 14 closer to the XA direction than the end placement surface 141. The guide fences 15 are separated from each other in the Y direction. The pair of guide fences 15 align the sheet S placed on the elevating plate 14 along the X direction.

Each of the pair of guide fences 15 includes a protruding piece extending in the X direction above the elevating plate 14. The height of each guide fence 15 is greater than the total thickness of the number of sheets S that can be stacked on the manual feed tray 13. Each guide fence 15 is supported by the elevating plate 14 so as to be movable in the Y direction. The distance between the protruding piece of each guide fence 15 in the Y direction can be changed by the user.

Figure 4:
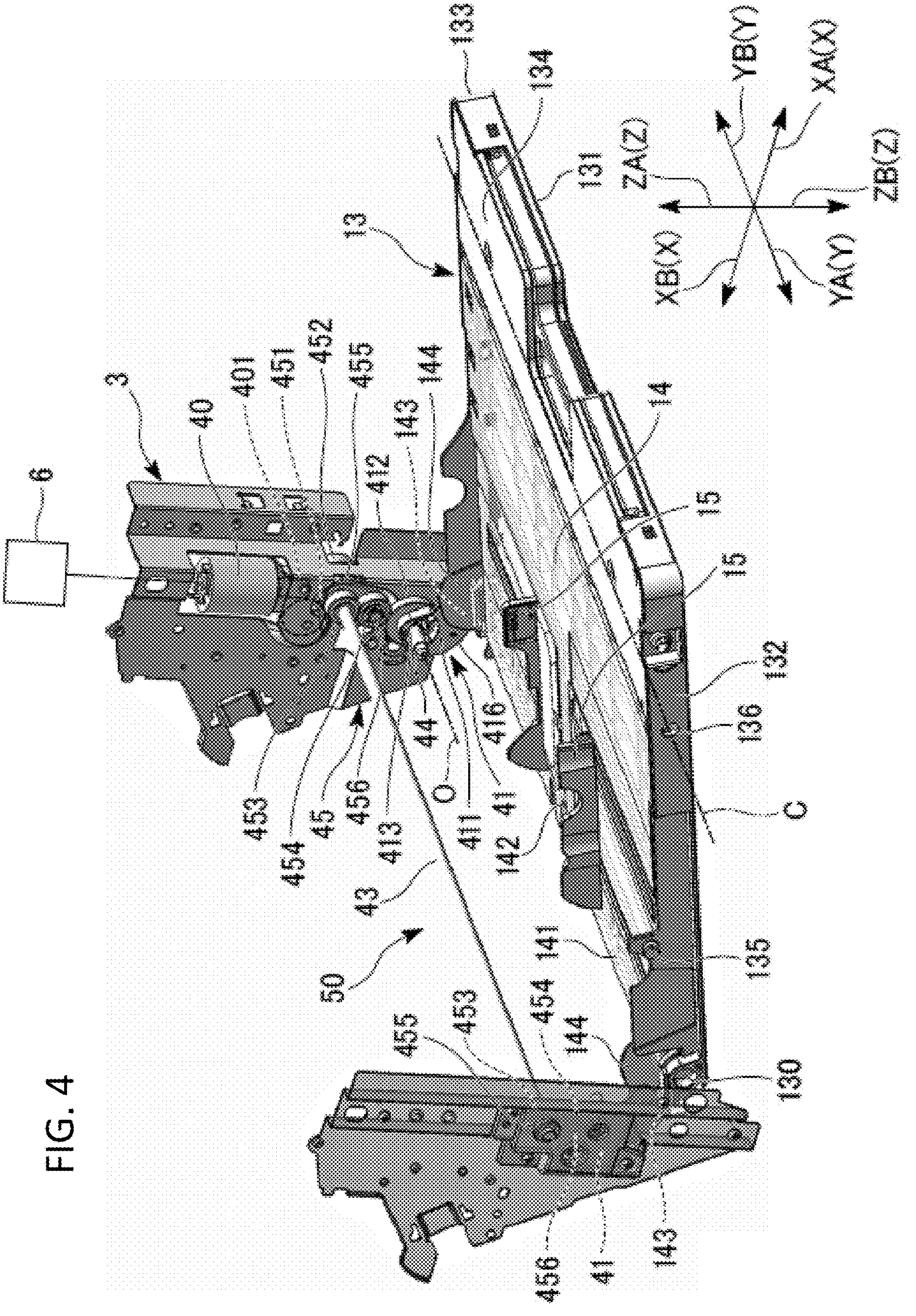
FIG. 4 is a perspective view of an elevating mechanism according to a first embodiment.

Cam contact surfaces 143 (see FIG. 4) are formed at the end portions in the Y direction of the elevating plate 14. As shown in FIG. 4, a cam plate portion 411 of a pressing member 41 abuts the cam contact surface 143. The shape of the cam contact surface 143 is not particularly limited the example shown in FIG. 4 as long as the elevating plate 14 can be pressed down toward the bottom plate 131 by a pressing force from the cam plate portion 411. In the example shown in FIG. 4, each cam contact surface 143 is flat along the end placement surface 141.

In the present embodiment, a plate-shaped protrusion 144 is provided between each cam contact surface 143 and the end placement surface 141. Each of the plate-shaped protrusions 144 has a plate shape parallel to the front side plate 132 and the rear side plate 133. Each of the plate-shaped protrusions 144 protrudes upward from the elevating plate 14 in a chevron shape. Each of the plate-shaped protrusions 144 extends in the X direction from the end portion of the elevating plate 14 in the XB direction to the end portion of the guide fence 15 in the XB direction.

With such a configuration, in the manual feed tray 13 alone, the end portion in the XB direction of the elevating plate 14 biased by the urging member 16 protrudes upward from the upper ends of the front side plate 132 and the rear side plate 133. When an external force toward the bottom plate 131 acts on each cam contact surface 143, the elevating plate 14 moves downward toward the bottom plate 131. At the lowermost position of the elevating plate 14, the upper surface of the elevating plate 14 is in the same plane as (flush with) the upper plate 134.

The position of the elevating plate 14 lowered to the lowermost position is hereinafter referred to as a lower position. FIG. 2 shows the manual feed tray 13 in which the elevating plate 14 is moved to the lower position. The position of the elevating plate 14 when the XB direction end portion thereof is higher than the lower position with respect to the bottom plate 131 is referred to as an upper position. In the manual feed tray 13 alone, the highest position of the elevating plate 14 raised from the bottom plate 131 is higher than the height from the bottom plate 131 to the pickup roller 121 when the manual feed tray 13 is attached to the printer unit 3. However, in a state of being attached to the printer unit 3, the friction pad 142 abuts the pickup roller 121 when the elevating plate 14 is at the upper position. Therefore, the elevating plate 14 is raised until the friction pad 142 contacts the lower end of the pickup roller 121.

In the manual feed tray 13 in the open state, the elevating plate 14 is normally at the lower position by the elevating mechanism 50 (see FIG. 4). The user can place the sheets S on the elevating plate 14 and the upper plate 134 of the manual feed tray 13. For example, the sheets S can be placed until the top thereof reaches the lower end of the pickup roller 121.

As shown in FIG. 4, the motor 40 includes an output shaft 401 extending in the Z direction. The output shaft 401 protrudes from the motor body in the ZB direction. The motor 40 is a driving source that applies a rotational driving force to a drive transmission unit 45 by rotation of the output shaft 401. The motor 40 is fixed to the main body of the printer unit 3 via a support member.

As shown in FIG. 1, the elevating mechanism 50 is provided in the main body of the printer unit 3. The elevating mechanism 50 moves the elevating plate 14 between the lower position and the upper position when the manual feed tray 13 is in the open state.

Figure 5:
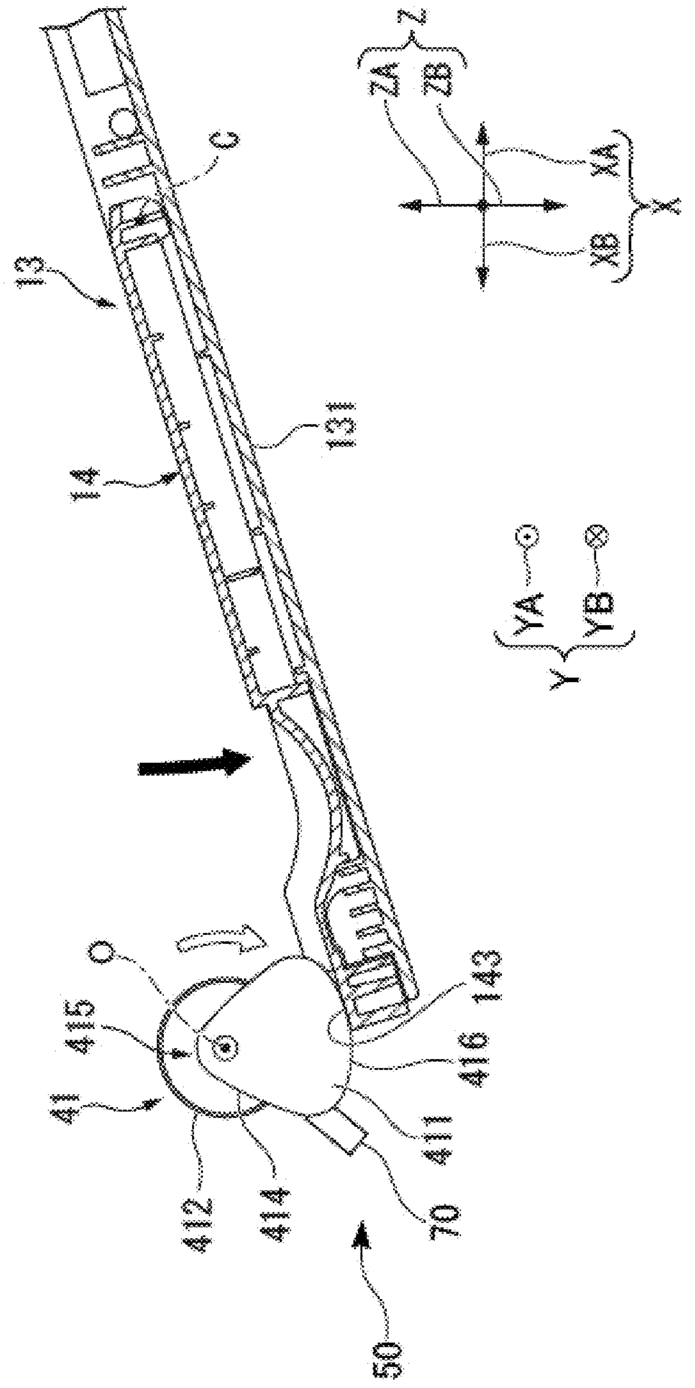
FIG. 5 depicts a lower position of an elevating plate according to a first embodiment.
Figure 6:
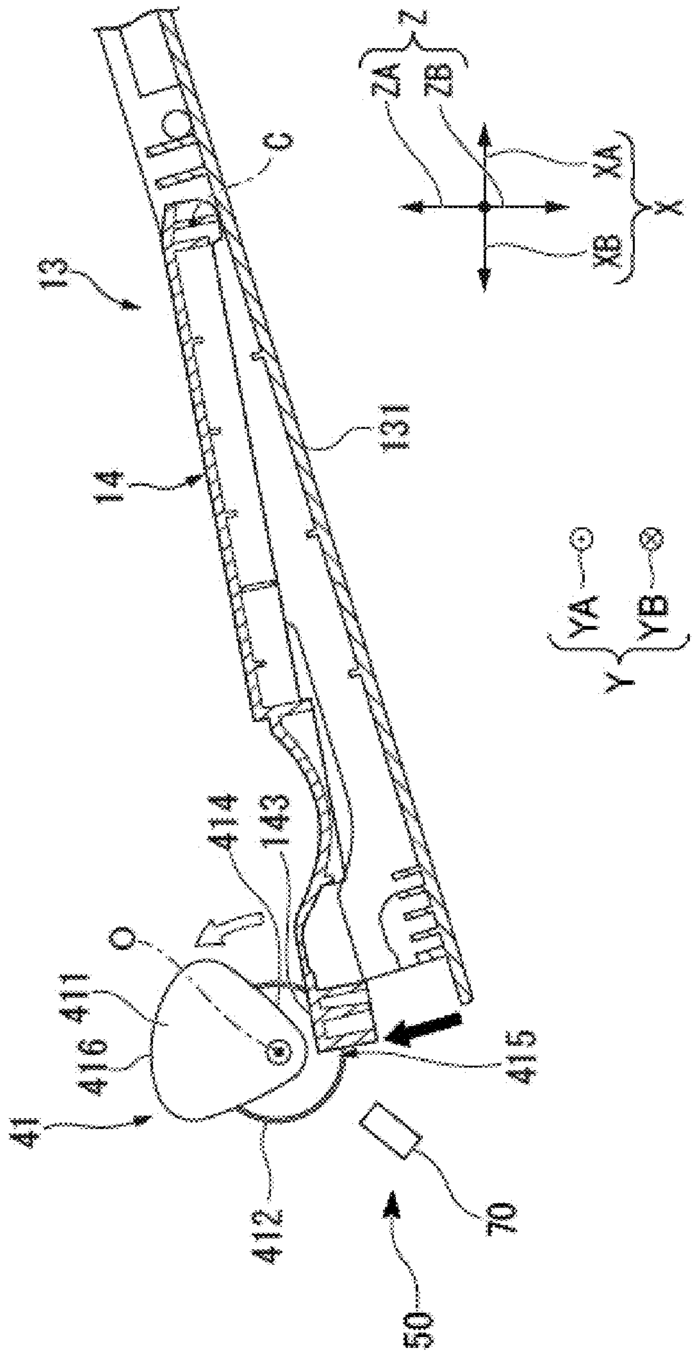
FIG. 6 depicts a upper position of an elevating plate according to a first embodiment.

FIG. 4 is a perspective view of the elevating mechanism 50 according to the first embodiment. FIG. 5 depicts the lower position of the elevating plate 14 according to the first embodiment. FIG. 6 depicts the upper position of the elevating plate 14 according to the first embodiment. As shown in FIG. 4, the elevating mechanism 50 includes the pressing member 41 and the drive transmission unit 45.

The pressing member 41 comes into contact with each cam contact surface 143 of the elevating plate 14 to limit the height of the elevating plate 14. For this reason, the pressing member 41 is provided above each cam contact surface 143. To distinguish two pressing members 41, the pressing member 41 on the front side (YA direction side) is referred to as the front-side pressing member 41, and the pressing member 41 on the rear side (YB direction side) is referred to as the rear-side pressing member 41. The front-side pressing member 41 and the rear-side pressing member 41 have shapes that are plane-symmetrical to each other with respect to the ZX plane. Therefore, the following description will be made with reference to the rear-side pressing member 41. Regarding the structure of the front-side pressing member 41, the YB direction referred to in the following description for the rear-side pressing member 41 may be replaced with the YA direction.

The rear-side pressing member 41 includes the cam plate portion 411 and a gear portion 412. The gear portion 412 receives a driving force from the drive transmission unit 45. For example, the gear portion 412 is a spur gear. A bearing portion 413 that opens in the Y direction is provided at the center of the gear portion 412. The rotation support shaft 44 extending in the Y direction is inserted into the bearing portion 413. The gear portion 412 is rotatable about the central axis O of the rotation support shaft 44. For example, the rotation support shaft 44 protrudes toward the YA direction from the rear side plate of the main body adjacent to the gear portion 412 in the YB direction. The length of the rotation support shaft 44 in the Y direction is longer than the length of the rear side pressing member 41 in the Y direction.

The cam plate portion 411 is provided at an end portion of the gear portion 412 in the YA direction. As shown in FIG. 5, the cam plate portion 411 is a rotary flat cam (so-called plate cam) that rotates integrally with the gear portion 412 about the central axis O of the rotary support shaft 44. The outer shape of the cam plate portion 411 as viewed from the YB direction is a fan shape that bulges radially outward from the gear portion 412.

As shown in FIG. 4, the cam plate portion 411 extends radially outward from the central portion of the gear portion 412, and the end thereof protrudes outward in the radial direction. The cam plate portion 411 is formed in a fan-shaped range including the bearing portion 413 on the radially inner side of the gear portion 412. The bearing portion 413 penetrates the cam plate portion 411 in the thickness direction thereof.

As shown in FIG. 5, the cam plate portion 411 includes a cam base portion 414 and a cam nose portion 416. The cam base portion 414 includes a portion that forms a base circle of the cam plate portion 411. The cam base portion 414 is provided coaxially with the gear portion 412. The outer shape of the cam base portion 414 is smaller than the outer shape of the gear portion 412. The cam nose portion 416 protrudes radially outward from the cam base portion 414 beyond the gear portion 412. An outer peripheral surface of the cam nose portion 416 is curved outward in the radial direction. Both end portions of the cam nose portion 416 in the circumferential direction are curved outward and are continuous with the outer edge of the cam base portion 414.

The motor 40 and the drive transmission unit 45 are used to swing the pressing member 41. The motor 40 is communicably connected to the control unit 6. Any type of the motor 40 may be used as long as the pressing member 41 can be swung in cooperation with the drive transmission unit 45. For example, the drive transmission unit 45 may have a swing mechanism that converts rotation of the output shaft 401 into swing motion, or may not have a swing mechanism. The rocking mechanism can be formed by, for example, a cam, a link, or a combination thereof. Hereinafter, as shown in FIG. 4, an example in which the drive transmission unit 45 does not have a swing mechanism will be described. In such a case, the motor 40 controls the output shaft 401 to rotate forward and backward. Any type of the motor 40 may be used as long as the output shaft 401 can be rotated forward and backward in accordance with a control signal from the control unit 6. For example, a DC motor, a stepping motor or the like may be used as the motor 40. Alternatively, when the drive transmission unit 45 has a swing mechanism, the motor 40 rotates in one direction.

The drive transmission unit 45 transmits the rotation of the output shaft 401 to the pressing member 41. Any configuration of the drive transmission unit 45 may be employed as long as rotation can be transmitted. In the example shown in FIG. 4, the drive transmission unit 45 has a gear transmission mechanism. The drive transmission unit 45 includes a first gear 451, a second gear 452, a shaft 43, a third gear 453, and a fourth gear 454.

The first gear 451 is a worm gear fixed to the output shaft 401. The second gear 452 is a worm wheel that meshes with the first gear 451. The second gear 452 is rotatable about an axis extending in the Y direction.

The shaft 43 has a cylindrical shape extending in the Y direction. For example, the shaft 43 is made of metal. The shaft 43 is rotated by driving of the motor 40. The shaft 43 is a rotating shaft that transmits rotation of the second gear 452. The shaft 43 has a length so as to penetrate through the front side plate and the rear side plate facing each other in the Y direction. The shaft 43 is rotatably supported by bearings 455 disposed on a front side plate and a rear side plate of the main body of the printer unit 3.

The third gear 453 and the fourth gear 454 transmit the rotation of the shaft 43 to the front-side pressing member 41 and the rear-side pressing member 41. For this reason, the third gear 453 and the fourth gear 454 are disposed on each of the rear side (YB direction side) of the front side plate and the front side (YA direction side) of the rear side plate. The number of teeth and the module of each third gear 453 are equal to each other. The number of teeth and the module of each fourth gear 454 are equal to each other. Hereinafter, in order to distinguish the third gears 453 from each other, the third gear 453 on the rear side (YB direction side) of the front side plate is referred to as the front-side third gear 453, and the third gear 453 on the front side (YA direction side) of the rear side plate is referred to as the rear-side third gear 453. Further, the fourth gear 454 on the rear side (YB direction side) of the front side plate is referred to as the front side fourth gear 454, and the fourth gear 454 on the front side (YA direction side) of the rear side plate is referred to as the rear side fourth gear 454.

The rear-side third gear 453 is fixed to the front side of the rear side plate at the rear end portion of the shaft 43. The front-side third gear 453 is fixed to the rear side of the front side plate at the front end portion of the shaft 43. Therefore, the rear-side third gear 453 and the front-side third gear 453 rotate in the same direction as the shaft 43.

The rear-side fourth gear 454 is an idler gear provided on a transmission path between the gear portion 412 of the rear-side pressing member 41 and the rear-side third gear 453. The rear-side fourth gear 454 is rotatably attached to a rotation support shaft 456 protruding from the rear side plate in the YA direction. The front-side fourth gear 454 is an idler gear provided on a transmission path between the gear portion 412 of the front-side pressing member 41 and the front-side third gear 453. The front-side fourth gear 454 is rotatably attached to a rotation support shaft 456 protruding from the front plate in the YB direction.

According to the drive transmission unit 45 having such a configuration, when the motor 40 rotates, the pressing members 41 rotate in synchronization with each other in the same direction. Thus, the pressing members 41 swing about the central axis O in accordance with forward and reverse rotations of the motor 40. Here, the central axis O is a swing axis that extends in the Y direction and about which the cam plate portion 411 of the pressing member 41 swings.

FIG. 5 is a diagram illustrating a position (hereinafter referred to as the cam-down position) of the cam plate portion 411 at the lower position of the elevating plate 14 according to the first embodiment. Here, the cam-down position means a position where the cam plate portion 411 faces downward. FIG. 6 is a diagram illustrating the position of the cam (hereinafter referred to as the cam-up position) at the upper position of the elevating plate 14 according to the first embodiment. Here, the cam-up position refers to a position where the cam plate portion 411 faces upward.

As shown in FIG. 5, the elevating mechanism 50 includes a position sensor 70 that detects the swing position of the pressing member 41. For example, the position sensor 70 detects the most clockwise swing position and the most counterclockwise swing position of the pressing member 41 when viewed from the YB direction. The position sensor 70 sends a detection signal to the control unit 6. The most clockwise swing position is a position where the cam plate portion 411 faces downward and pushes down the elevating plate 14 to the lower position (see FIG. 5). The most clockwise swing position is the home position of the pressing member 41. The most counterclockwise swing position is a position where the cam plate portion 411 faces upward and is separated from the elevating plate 14 that has been raised most (see FIG. 6).

As shown in FIG. 1, the control unit 6 controls the entire image forming apparatus 100 and each components thereof. For example, the control unit 6 controls the control panel 1, the scanner unit 2, the printer unit 3, the sheet feed unit 4, the conveying unit 5, and the manual feed unit 10 to convey the sheet S and form an image on the sheet S. For example, the control unit 6 sends a control signal to the motor 40 (see FIG. 3) to control the position of the elevating plate 14. For example, the control unit 6 has a processor such as a CPU (Central Processing Unit).

Next, the operation of the image forming apparatus 100 will be described focusing on the elevating operation of the elevating plate 14 and the swinging operation of the pressing member 41 in the manual feed tray 13.

First, an image forming operation of the image forming apparatus 100 will be briefly described. In the image forming apparatus 100 shown in FIG. 1, image formation is started by an operation of the control panel 1 or an external signal. The image information is sent to the printer unit 3 after an object to be copied is read by the scanner unit 2 or sent to the printer unit 3 from the outside. The printer unit 3 supplies the sheet S in the sheet feed unit 4 or the sheet S in the manual feed unit 10 to the registration rollers 24 based on a control signal generated by the control unit 6 based on an operation of the control panel 1 or an external signal. A case where the sheet S is supplied by the sheet feed unit 4 will be described as an example. In other examples, the sheets S may instead be supplied by the manual feed unit 10. When an image forming operation is input from the control panel 1, the control unit 6 starts sheet feeding from the sheet feed unit 4 and image formation.

The image forming units 251, 252, 253, and 254 form electrostatic latent images on the respective photosensitive drums 7 based on image information corresponding to the respective colors. Each electrostatic latent image is developed by the corresponding developing device 8. Therefore, a toner image corresponding to the electrostatic latent image is formed on the surface of each photosensitive drum 7. Each toner image is primarily transferred to the intermediate transfer belt 27 by the corresponding transfer roller. As the intermediate transfer belt 27 moves, the toner images are sequentially superimposed on each other without causing color misregistration, and are sent to the transfer unit 28. The sheet S is fed from the registration rollers 24 to the transfer unit 28. The toner image having reached the transfer unit 28 is secondarily transferred onto the sheet S. The secondarily transferred toner image is fixed to the sheet S by the fixing device 29. Thus, an image is formed on the sheet S.

Next, the operation of the manual feed tray 13 will be described in detail. In order to place the sheet S on the manual feed tray 13, as illustrated in FIG. 5, the elevating plate 14 needs to be disposed at the lower position. On the other hand, in order to feed the sheet S toward the conveying unit 5 to form an image on the sheet S placed on the manual feed tray 13, it is necessary to raise the elevating plate 14 to a position where the pickup roller 121 can be brought into contact with the uppermost surface of the sheet S. FIG. 5 depicts the lower position of the elevating plate 14 according to the first embodiment. FIG. 6 depicts the upper position of the elevating plate 14 according to the first embodiment.

As shown in FIG. 5, in order to arrange the elevating plate 14 at the lower position, it is necessary to move the cam nose portion 416 of each pressing member 41 downward to a first position by rotating it clockwise in the drawing. At this time, the cam nose portion 416 pushes down each cam contact surface 143 of the elevating plate 14. The urging member 16 disposed between the bottom plate 131 and the elevating plate 14 (see FIG. 2) is compressed by the pressing force from each pressing member 41. In such a position of the elevating plate 14, a substantially central portion of the cam nose portion 416 in the circumferential direction is in contact with the cam contact surface 143.

On the other hand, as shown in FIG. 6, the cam nose portion 416 of each pressing member 41 needs to be rotated counterclockwise in the drawing to move the elevating plate 14 upward to the position where the sheet can be fed. The cam nose portion 416 is rotatable to a second position above the first position as shown in FIG. 6. The cam nose portion 416 is separated from the cam contact surface 143 of the elevating plate 14 until the swing from the first position to the second position is completed.

The elevating plate 14 is raised to a position where the sheet S can abut the pickup roller 121 by an elastic restoring force of the urging member 16 (see FIG. 2). The elevating plate 14 shown in FIG. 6 is at the uppermost position in a case where the sheet S is not placed. At this time, the cam contact surface 143 enters a space 415 on the side in the Y direction of the pressing member 41 moved to the second position, and is raised to the vicinity of the cam base portion 414. A gap is formed between the cam base portion 414 and the end portion of the elevating plate 14 in the XB direction.

Here, the appearance of the side cover 18 at the lower position of the elevating plate 14 will be described. As shown in FIG. 2, the side cover 18 covers the elevating mechanism 50 (see FIG. 3) on the upper side of the sheet feed opening 182 and at both ends thereof in the Y direction. The side cover 18 includes a side cover portion 184 extending in the Y direction above the sheet feed opening 182. The side cover portion 184 covers the entire shaft 43 (see FIG. 3) of the elevating mechanism 50. Thus, the user cannot touch the shaft 43 from the outside of the side cover 18.

The driving force of the motor 40 may be transmitted to the shaft 43 via a power transmission mechanism other than a gear train such as a belt and a pulley. For example, the power transmission mechanism may have various configurations in accordance with required specifications.

Next, the load applying mechanism 60 will be described. As shown in FIG. 3, the load applying mechanism 60 applies a load to the shaft 43. The load applying mechanism 60 is provided on the YB direction side of the side cover 18. The load applying mechanism 60 is disposed near the rear-side third gear 453. The load applying mechanism 60 is not provided on the YA direction side of the side cover 18.

The load applying mechanism 60 includes a sliding member 61 and an urging member 65. The sliding member 61 is slidable with respect to the shaft 43. For example, the sliding member 61 is formed of resin such as polyacetal (POM). For example, the sliding member 61 is preferably formed of a material that can smoothly slide on the shaft 43. The sliding member 61 is disposed near the rear-side third gear 453 in the axial direction of the shaft 43.

Figure 7:
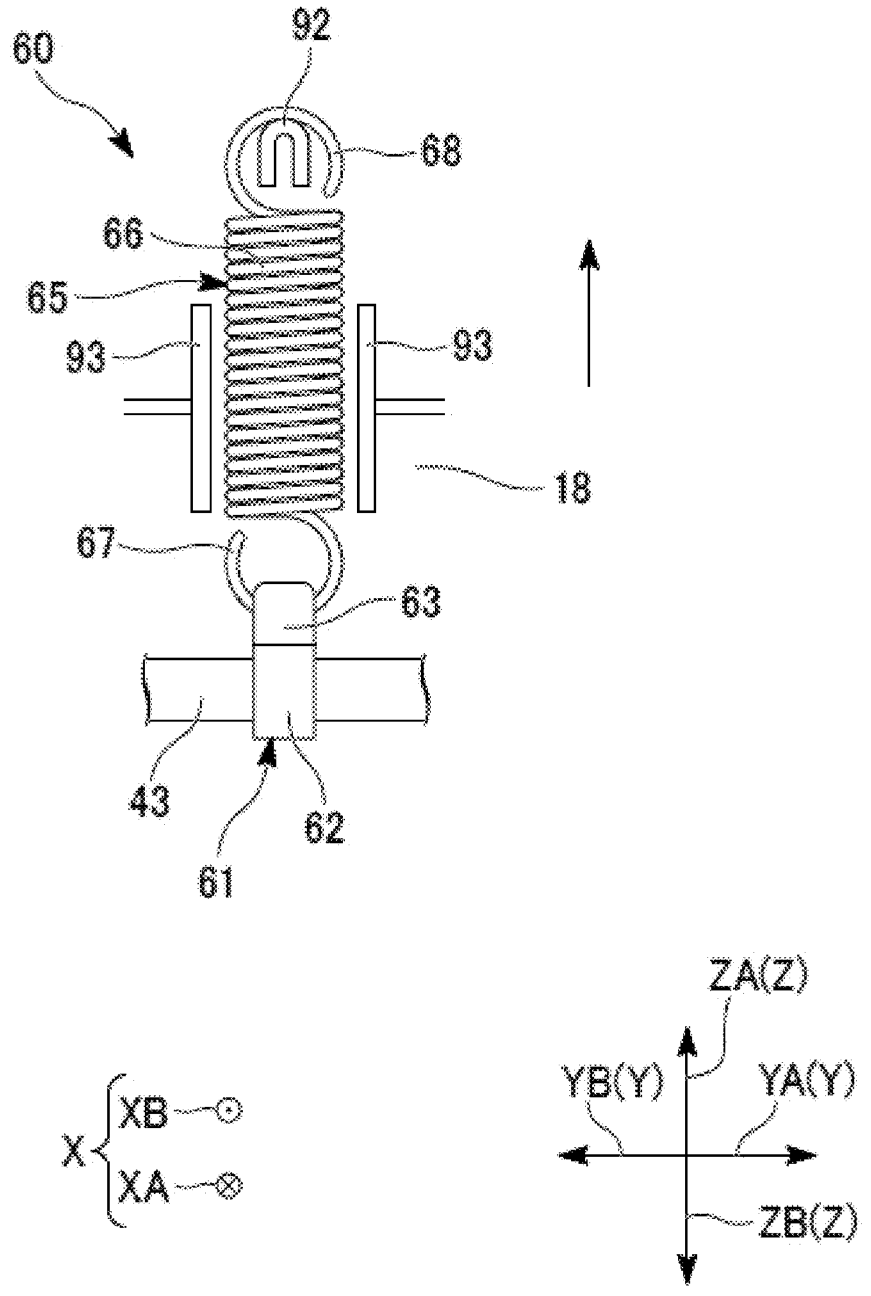
FIG. 7 is a peripheral enlarged view of a load applying mechanism according to a first embodiment.

FIG. 7 is an enlarged view of the load applying mechanism 60 according to the first embodiment. As shown in FIG. 7, the sliding member 61 includes an annular portion 62 and a bulging portion 63. The annular portion 62 and the bulging portion 63 are integrally formed of the same member.

The annular portion 62 has an annular shape coaxial with the shaft 43. The inner diameter of the annular portion 62 is substantially the same as the outer diameter of the shaft 43. The bulging portion 63 bulges radially outward from a part of the annular portion 62. The bulging portion 63 has a shape to which one end of the urging member 65 (first hook 67) can be attached.

For example, the urging member 65 is a tension coil spring. The urging member 65 pulls the sliding member 61 outward in a direction orthogonal to the shaft 43 (the direction of the arrow in FIG. 7, the ZA direction). The urging member 65 constantly urges the sliding member 61 in a pulling direction. The urging member 65 includes a spring 66, the first hook 67, and a second hook 68.

The spring 66 is disposed so as to be extendable in the Z direction orthogonal to the shaft 43. The first hook 67 is provided at one end of the spring 66. The first hook 67 is attached to the bulging portion 63 of the sliding member 61. The second hook 68 is provided at the other end of the spring 66. The second hook 68 is attached to a claw portion 92 protruding from the side cover 18 in the XB direction.

A pair of limiting wall portions 93 are disposed on the side cover 18 for limiting the position of the spring 66 (movement in a direction parallel to the shaft 43). The pair of limiting wall portions 93 are provided with the spring 66 interposed therebetween. The limiting wall portions 93 extend in the Z direction.

The first hook 67 of the urging member 65 is detachably attached to the bulging portion 63 of the sliding member 61. The second hook 68 of the urging member 65 is detachably attached to the claw portion 92 of the side cover 18. The load applying mechanism 60 can adjust or change a load applied to the shaft 43 by replacing the urging member 65.

For example, when the load on the shaft 43 is maintained before and after the replacement of the urging member 65, the urging member 65 is replaced with an urging member having the same urging force as that before the replacement. For example, when the load on the shaft 43 is made larger than that before the replacement of the urging member 65, the urging member 65 is replaced with an urging member having a larger urging force than that before the replacement. For example, when the load on the shaft 43 is made smaller than that before the replacement of the urging member 65, the urging member 65 is replaced with an urging member having a smaller urging force than that before the replacement.

Although not specifically illustrated, the sheet conveying device 30 may include an overload protection device such as a torque limiter that interrupts transmission of a load when the load applying mechanism 60 applies the load equal to or greater than a threshold value to the elevating mechanism 50. By providing the overload protection device, it is possible to suppress an excessive load from being applied to the elevating mechanism 50. For example, such an overload protection device may be provided in the drive train between the motor 40 and the cam nose 416 or on the shaft 43. By providing the overload protection device on the shaft 43, it is possible to prevent an excessive load torque from being applied to the shaft 43.

As described above, the sheet conveying device 30 according to the first embodiment includes the manual feed tray 13, the motor 40, the elevating mechanism 50, and the load applying mechanism 60. The sheets S are placed on the manual feed tray 13. The motor 40 is a drive source. The elevating mechanism 50 raises and lowers the manual feed tray 13 by driving the motor 40. The load applying mechanism 60 applies a load to the elevating mechanism 50. With the above configuration, the following effects can be achieved. Since the load is applied to the elevating mechanism 50 by the load applying mechanism 60, it is possible to suppress a change in the load applied to the motor 40 during the elevating operation for the manual feed tray 13. Therefore, it is possible to suppress a change in the rotation speed of the motor 40 due to the load. Therefore, variations in the stop position of the manual feed tray 13 can be reduced. If the stop position of the manual feed tray 13 varies, there is a high possibility that the pressure of the pickup roller 121 varies. Due to variations in the pressing force of the pickup roller 121, if the pressing force is strong, multi-feeding may occur, and if the pressing force is weak, sheet conveyance failure may occur. In contrast, according to the first embodiment, variations in the stop position of the manual feed tray 13 can be reduced, and thus variations in the pressing force of the pickup roller 121 can be reduced. Therefore, it is possible to suppress multi-feeding and defective conveyance.

The elevating mechanism 50 includes the shaft 43 that is rotated by driving of the motor 40. The load applying mechanism 60 includes the sliding member 61 that is slidable with respect to the shaft 43 and the urging member 65 that urges the sliding member 61. With the above configuration, the following effects can be achieved. Since the load is applied to the shaft 43 via the sliding member 61, the rotation of the shaft 43 can be maintained when the manual feed tray 13 is raised or lowered, and the rotation of the shaft 43 can be stopped when the manual feed tray 13 is stopped. Therefore, the conveyance control of the sheet S can be performed with high accuracy. In addition, the configuration can be simplified as compared with a case where a driving device such as an actuator is provided as the load applying mechanism 60.

If only simple control such as applying a predetermined voltage to the motor 40 for a predetermined time is performed, there is a high possibility that the load after applying the voltage to the motor 40 becomes small and the overrun becomes large. It is difficult to control how much overrun occurs. For example, when the load torque applied to the shaft 43 is small after the voltage is applied to the motor 40, there is a high possibility that the shaft 43 passes over the determined rotation stop position. In contrast, according to the first embodiment, after the voltage is applied to the motor 40, even when the load torque applied to the shaft 43 is small, a load (braking force) for stopping the rotation of the shaft 43 is applied by the action of the load applying mechanism 60. For this reason, it is possible to suppress the shaft 43 from overshooting the determined rotation stop position. Therefore, the need for controlling overrun can be eliminated.

The sliding member 61 is made of resin. The sliding member 61 includes the annular portion 62 having an annular shape coaxial with the shaft 43. With the above configuration, the following effects can be achieved. In general, resin has a smaller coefficient of friction than metal. Therefore, resin is suitable for allowing the sliding member 61 to smoothly slide on the shaft 43 as compared with a case where the sliding member 61 is formed of metal. In addition, the inner peripheral surface of the annular portion 62 can be smoothly slidable with respect to the outer peripheral surface of the shaft 43.

Since the urging member 65 is a tension spring that pulls the sliding member 61 outward in a direction orthogonal to the shaft 43, the following effects are achieved. Since a load (tensile force) is applied to the shaft 43 via the sliding member 61, rotation of the shaft 43 can be maintained when the manual feed tray 13 is raised or lowered, and the shaft 43 can stop rotating when the manual feed tray 13 is stopped. Therefore, the conveyance control of the sheet S can be performed with high accuracy. In addition, as compared with a case where a pressing spring (for example, a compression coil spring) that presses the sliding member 61 is provided as the urging member 65, it is easy to simplify a mounting structure for the shaft 43.

Since the load applying mechanism 60 is disposed in the vicinity of the rear-side third gear 453 on the axis of the shaft 43, the following effects are achieved. Compared to a case where the load applying mechanism 60 is disposed at a position far away from the rear-side third gear 453, it is easy to apply a constant load to the shaft 43. Therefore, variations in the stop position of the manual feed tray 13 can be further reduced.

Since the load applying mechanism 60 can adjust the load on the shaft 43 by the replaceable urging member 65, the following effects can be achieved. By replacing the urging member 65, a desired load can be applied to the shaft 43. For example, when the urging member is replaced with an urging member having a larger urging force, variations in the stop position of the manual feed tray 13 can be reduced more effectively.

The image forming apparatus 100 includes the sheet conveying device 30 described above. The sheet conveying device 30 can reduce variations in the stop position of the manual feed tray 13. Therefore, the image forming apparatus 100 can smoothly form an image on the sheet S.

Figure 8:
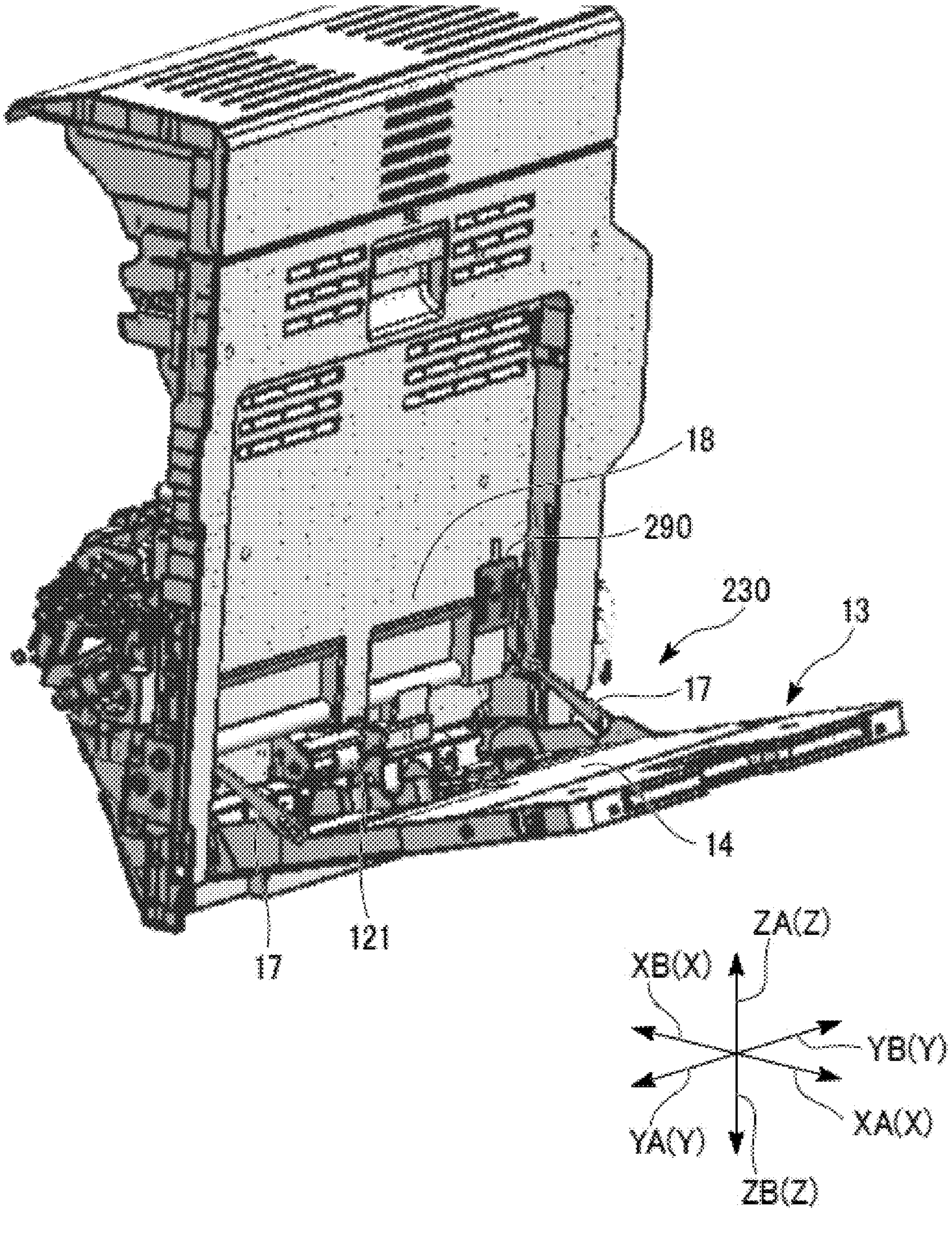
FIG. 8 is a perspective view of a sheet conveying device according to a second embodiment.
Figure 9:
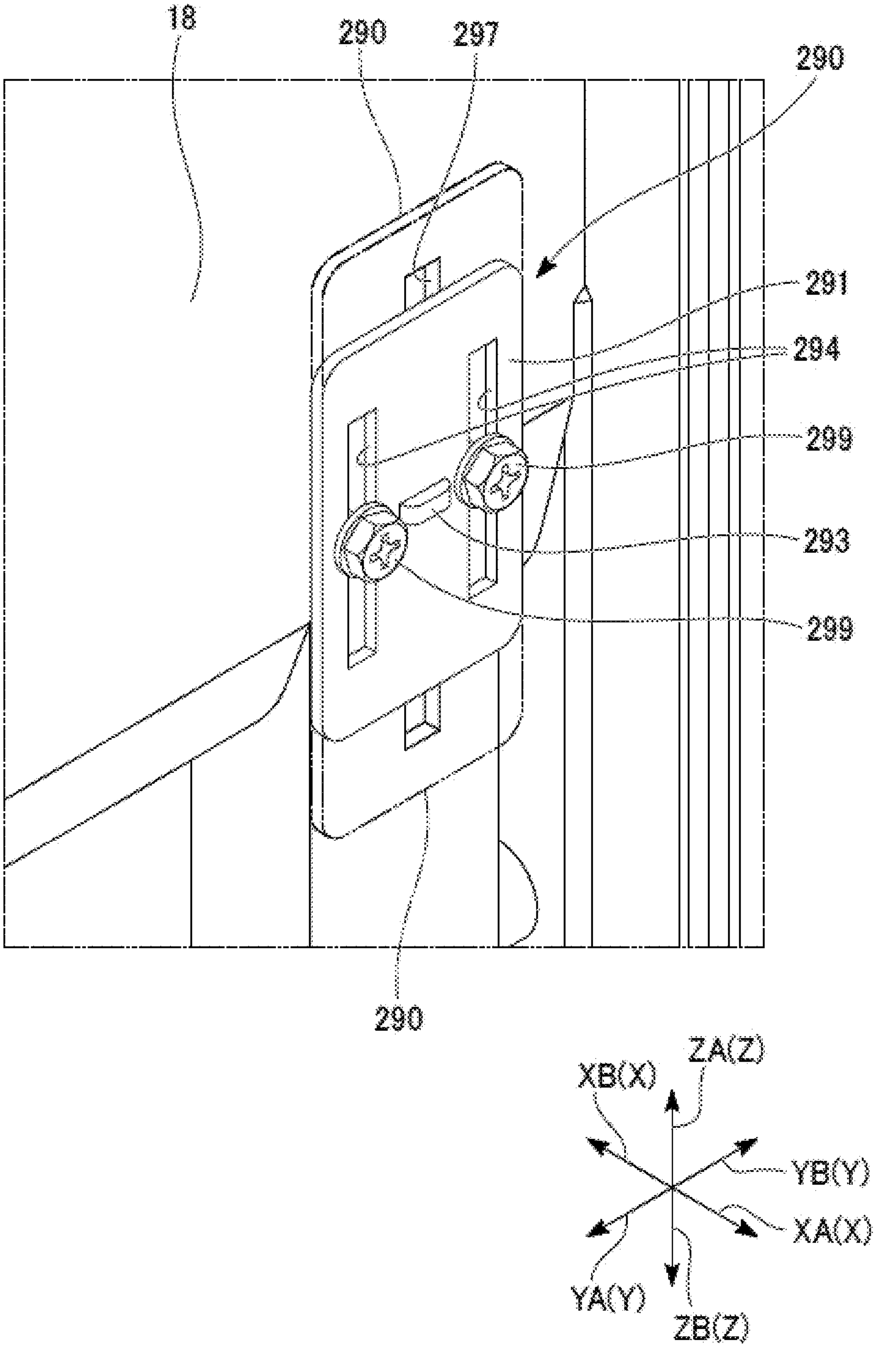
FIG. 9 is a perspective view of an engagement position variable member according to a second embodiment.
Figure 10:
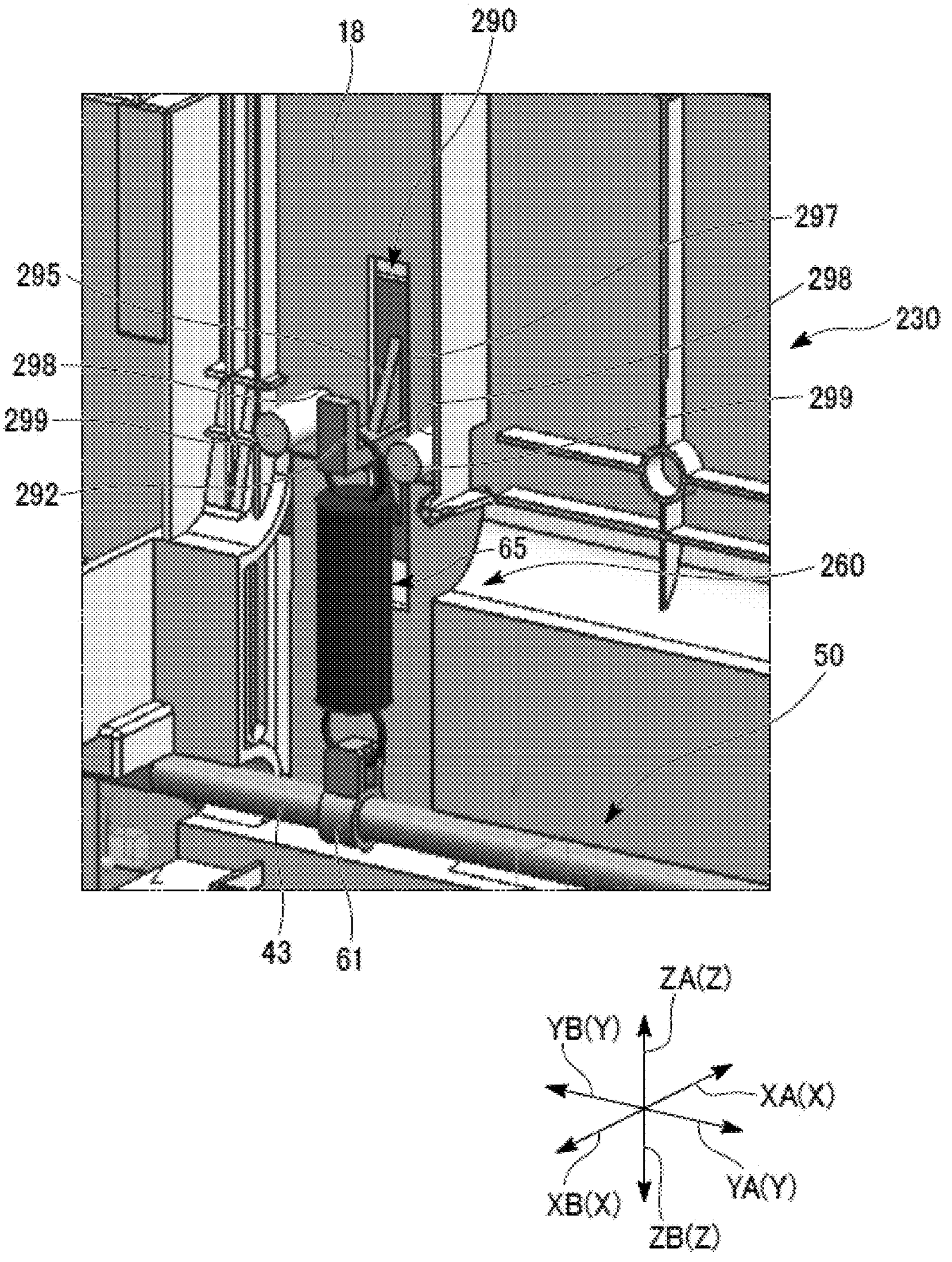
FIG. 10 is a perspective view of a load applying mechanism according to a second embodiment.

Next, a second embodiment will be described with reference to FIGS. 8 to 10. In the second embodiment, description of the same configuration as that of the first embodiment may be omitted. The second embodiment is different from the first embodiment in that the engagement position of the urging member 65 is not fixed and can be changed. FIG. 8 is a perspective view of a sheet conveying device 230 according to the second embodiment. FIG. 9 is a perspective view of an engagement position adjustment member 290 according to the second embodiment. FIG. 10 is a perspective view of a load applying mechanism 260 of the second embodiment. As shown in FIG. 10, the sheet conveying device 230 includes the load applying mechanism 260 that applies a load to the elevating mechanism 50.

The load applying mechanism 260 includes the engagement position adjustment member 290 capable of changing the engagement position of the urging member 65. As shown in FIG. 8, the engagement position adjustment member 290 is disposed on the side surface in the XA direction on the YB direction side of the side cover 18. As shown in FIG. 9, the engagement position adjustment member 290 includes a plate-shaped portion 291, a claw portion 292 (see FIG. 10), and a knob portion 293. The plate-shaped portion 291, the claw portion 292, and the knob portion 293 are integrally formed of the same member.

The plate-shaped portion 291 is formed in a rectangular plate shape having a long side in the Z direction and a short side in the Y direction. The plate-shaped portion 291 has a pair of through-holes 294 that open to allow male screws of bolts 299 to be inserted therethrough. The through-holes 294 are formed in a rectangular shape extending in the Z direction. The through-holes 294 are separated from each other in the Y direction. The through-holes 294 are formed on both sides of the plate-shaped portion 291 in the Y direction.

As shown in FIG. 10, the claw portion 292 protrudes from the plate-shaped portion 291 in the XB direction. The claw portion 292 is formed at the center of the plate-shaped portion 291 in the Y direction. The claw portion 292 is disposed between the pair of through-holes 294 (see FIG. 9) in the Y direction. The claw portion 292 is formed in an L-shape extending from the plate-shaped portion 291 in the XB direction and then bent toward the ZA direction. A rib 295 extending toward the side surface of the plate-shaped portion 291 in the XB direction is provided at the base of the claw portion 292. The length of the rib 295 in the X direction gradually increases from the end of the rib 295 in the ZA direction toward the base of the claw portion 292.

As shown in FIG. 9, the knob portion 293 protrudes from the plate-shaped portion 291 in the XA direction. The knob portion 293 is formed at the center of the plate-shaped portion 291 in the Y direction and the Z-direction. The knob portion 293 is disposed between the pair of through-holes 294 in the Y direction. The knob portion 293 has longitudinal direction in the Y direction.

As shown in FIG. 10, the side cover 18 has a claw insertion hole 297 that opens to allow insertion of the claw portion 292 of the engagement position variable member 290, and bolt insertion holes 298 that open to allow insertion of the male screws of the bolts 299. The claw insertion hole 297 is formed in a rectangular shape extending in the Z direction. The length of the claw insertion hole 297 in the Z direction is longer than the length of the through-hole 294 (see FIG. 9) of the plate-shaped portion 291 in the Z direction.

The bolt insertion holes 298 are formed in a circular shape. The bolt insertion holes 298 are separated from each other in the Y direction. The bolt insertion holes 298 are formed on both sides of the claw insertion hole 297 in the Y direction. The bolt insertion holes 298 are disposed at positions overlapping the through-holes 294 (see FIG. 9) of the plate-shaped portion 291 when viewed from the X direction. In the side cover 18, female screws to which the male screws of the bolts 299 are screwed are formed on the inner circumference of the bolt insertion holes 298.

For example, after the engagement position variable member 290 is disposed at a predetermined position of the side cover 18, the engagement position variable member 290 can be fixed by screwing the male screws of the bolts 299 into the female screws of the bolt insertion holes 298 through the through-holes 294. For example, in a state where the bolts 299 are loosened, the engagement position variable member 290 is movable in the Z direction.

The position of the engagement position variable member 290 indicated by the alternate long and short dash line in FIG. 9 indicates a state in which the engagement position variable member 290 has moved to the most ZA direction side. The position of the engagement position variable member 290 indicated by the two dot chain line in FIG. 9 indicates a state in which the engagement position variable member 290 has moved to the most ZB direction side. For example, the engagement position variable member 290 can be fixed at a predetermined position in the Z direction by screwing the male screws of the bolts 299 into the female screws of the bolt insertion holes 298 in a state in which the engagement position variable member 290 is moved to the predetermined position in the Z direction. Since the position of the claw portion 292 (see FIG. 10) in the Z direction is changed according to the position of the engagement position variable member 290 in the Z direction, the engagement position of the urging member 65 can be changed.

According to the second embodiment, the load applying mechanism 260 includes the engagement position variable member 290 capable of changing the engagement position of the urging member 65, and thus the following effects are achieved. By changing the engagement position of the urging member 65, a desired load can be applied to the shaft 43. For example, when the load on the shaft 43 is made smaller than the reference load, the life of the urging member 65 can be extended. On the other hand, when the load applied to the shaft 43 is larger than the reference load, variations in the stop position of the manual feed tray 13 can be more effectively reduced.

Figure 11:
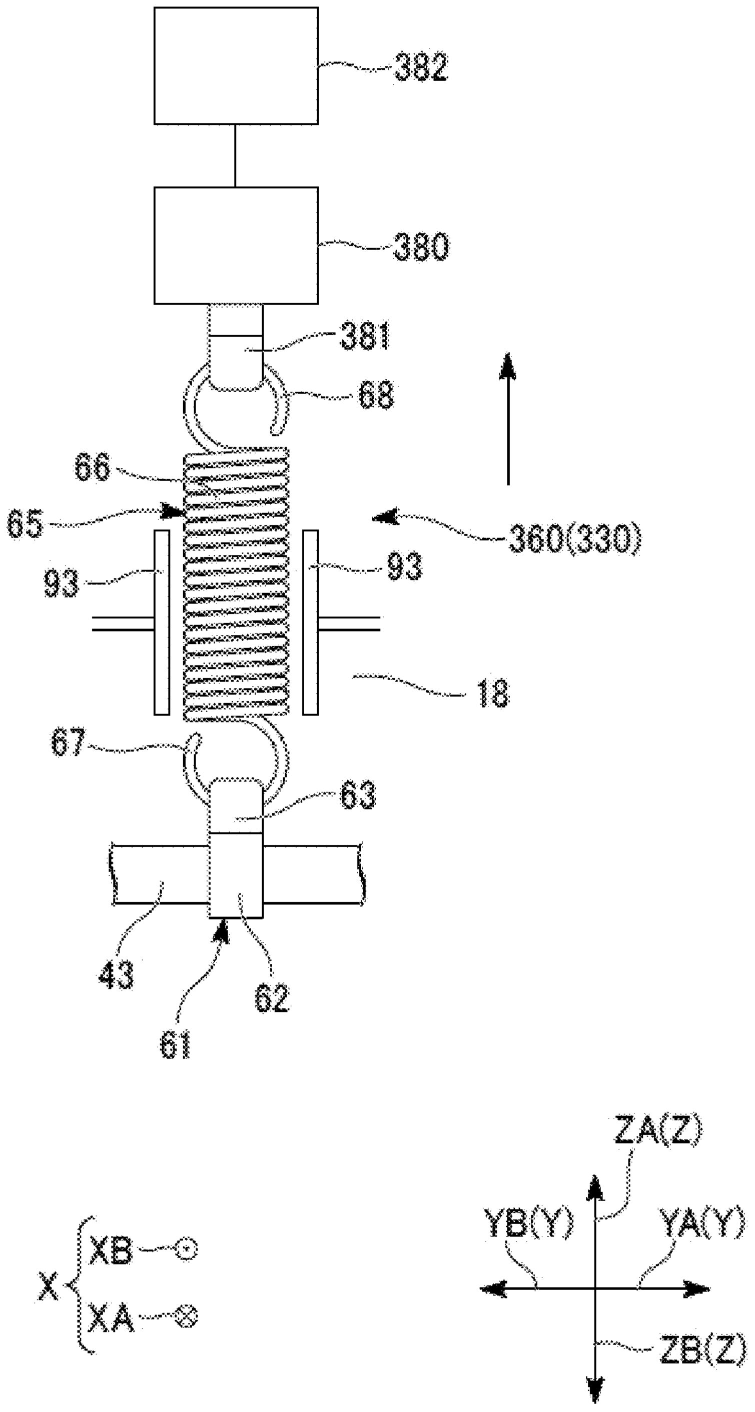
FIG. 11 is a peripheral enlarged view of a load applying mechanism according to a third embodiment.

Next, a third embodiment will be described with reference to FIG. 11. In the third embodiment, description of the same configuration as that of the first embodiment may be omitted. The third embodiment differs from the first embodiment in that the second hook 68 is attached to not the claw portion 92 of the side cover 18 but a load adjustment device 380. FIG. 11 is an enlarged view of a load applying mechanism 360 according to the third embodiment. As shown in FIG. 11, the load applying mechanism 360 includes the load adjusting device 380 and a load control device 382 in addition to the sliding member 61 and the urging member 65.

The load adjustment device 380 is capable of adjusting a load on the shaft 43. For example, the load adjustment device 380 is an actuator such as a solenoid. The load adjustment device 380 includes a hook support portion 381 that supports the second hook 68. The load adjustment device 380 can move the hook support portion 381 in a direction (ZA direction or ZB direction) orthogonal to the shaft 43.

When the load on the shaft 43 is made smaller than the reference load, the load adjustment device 380 moves the hook support portion 381 in the ZB direction (the direction opposite to the arrow direction in FIG. 11). That is, the hook support portion 381 is brought close to the shaft 43. When the load on the shaft 43 is greater than the reference load, the load adjustment device 380 moves the hook support portion 381 in the ZA direction (the direction of the arrow in FIG. 11). That is, the hook support portion 381 is moved away from the shaft 43.

The load control device 382 is controlled according to a predetermined program executed by a processor such as an CPU. The load control device 382 comprises the processor, a ROM (Read Only Memory) for storing programs, and a RAM (Random Access Memory) for temporarily storing programs. Additionally or alternatively, the function of the load control device 382 may be performed by integrated circuits such as LSI (Large Scale Integration).

The load control device 382 controls the load adjustment device 380 so as to adjust the load on the shaft 43 based on the number of elevating operations for the elevating mechanism 50 in the sheet conveyance device 330 (hereinafter referred to as the "number of ascending operations"). The load control device 382 stores life data acquired by a durability test or the like of the urging member 65 performed in advance. For example, the life data is data of an urging force (spring force of the spring 66) distribution map acquired by a predetermined number of elevating operations.

The urging force of the urging member 65 tends to decrease as the number of elevating operations increases. Therefore, in order to keep the load on the shaft 43 constant, it is necessary to control the load adjusting device 380 so that the urging force increases as the number of elevating operations increases. In the present embodiment, the load control device 382 controls the load adjustment device 380 so as to move the hook support portion 381 away from the shaft 43 every predetermined number of elevating operations.

According to the third embodiment, the sheet conveying device 330 includes the load adjusting device 380 capable of adjusting the load on the shaft 43, and thus the following effects are achieved. A desired load can be applied to the shaft 43. For example, when the load on the shaft 43 is made smaller than the reference load, the life of the urging member 65 can be extended. On the other hand, when the load applied to the shaft 43 is larger than the reference load, variations in the stop position of the manual feed tray 13 can be more effectively reduced.

The sheet conveying device 330 includes the load control device 382 that controls the load adjustment device 380 so as to adjust the load on the shaft 43 based on the number of elevating operations, and thus has the following effects. An optimum load can be automatically applied to the shaft 43 under the control of the load control device 382.

Next, modifications to the above embodiments will be described. The load applying mechanisms 60, 260, and 360 of the above embodiments apply a load to the shaft 43. Alternatively, the load applying mechanism according to a modification may apply a load to a member different from the shaft 43 in the elevating mechanism 50. For example, the load applying mechanism may apply a load to a member between the motor 40 and the cam nose portion 416. The structure of the member to which the load is applied by the load applying mechanism can be changed according to the required specification.

The load applying mechanisms 60, 260, and 360 of the above embodiments include the sliding member 61 slidable with respect to the shaft 43. On the other hand, the load applying mechanism in a modification may not include the sliding member 61. For example, the load applying mechanism may include an urging member that directly urges the shaft 43. The structure of the load applying mechanism can be changed according to the required specification.

The sliding member 61 according to the above embodiments is formed of resin. Alternatively, the sliding member in a modification may be formed of metal. For example, the structure of the sliding member 61 can be changed according to the required specification.

The load applying mechanism 60, 260, and 360 of the above embodiments are disposed in the vicinity of the rear-side third gear 453 on the axis of the shaft 43. On the other hand, the load applying mechanism in a modification may be disposed separated from the rear-side third gear 453. For example, the load applying mechanism may be disposed near the front-side third gear 453 on the axis of the shaft 43. For example, the load applying mechanism may be disposed near the longitudinal center of the shaft 43. For example, the structure of the load applying mechanism can be changed according to the required specification.

The urging member 16 of the above embodiments is a tension coil spring. In contrast, the urging member in a modification may be a compression coil spring. For example, the urging member may not have hooks. For example, the urging member may always urge the sliding member 61 in a direction in which the sliding member 61 is pushed. For example, the structure of the urging member can be changed according to the required specification.

The sheet conveying device 30 according to the above embodiments is installed in the image forming apparatus 100. However, the sheet conveying device 30 may be installed in a decoloring apparatus. In such a case, the fixing device 29 is replaced with a decoloring device. The decoloring device performs a process of decoloring or erasing an image formed on a sheet with decolorable toner.

According to at least one embodiment described above, since a load is applied to the elevating mechanism 50 by the load applying mechanism 60, it is possible to suppress a change in the load applied to the motor 40 during the elevating operation of the sheet tray. Therefore, it is possible to suppress a change in the rotation speed of the motor 40 due to the load. Therefore, variations in the stop position of the sheet tray can be reduced.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet conveying device, comprising:
a sheet tray on which one or more sheets can be placed;
a pickup roller with which a sheet can be picked up from the sheet tray;
an elevating mechanism including:
a shaft rotated by a motor, and
a cam attached to the shaft and rotated together with the shaft to raise and lower the sheet tray with respect to the pickup roller; and
a load applying mechanism configured to contact the shaft and apply a load thereto.

2. The sheet conveying device according to claim 1, wherein the load applying mechanism includes:
a sliding member that contacts the shaft and is slidable along the shaft, and
an urging member configured to urge the sliding member toward a first direction crossing a rotation axis of the shaft.

3. The sheet conveying device according to claim 2, further comprising:
a side cover for covering the motor, the elevating mechanism, and the load applying mechanism, wherein
the urging member is disposed along an inner surface of the side cover.

4. The sheet conveying device according to claim 3, wherein the urging member is attached to the inner surface of the side cover.

5. The sheet conveying device according to claim 3, wherein the load applying mechanism further includes an adjustment member to which the urging member is attached, the adjustment member being movable along the side cover.

6. The sheet conveying device according to claim 5, wherein
the side cover has a hole, and
the adjustment member includes:
a plate movable along an outer surface of the side cover, and
a claw extending from the plate through the hole, the urging member being attached to claw.

7. The sheet conveying device according to claim 3, wherein
one end of the urging member is connected to the sliding member, and
the load applying mechanism further includes an adjusting device connected to the other end of the urging member, the adjusting device being movable along the inner surface of the side cover.

8. The sheet conveying device according to claim 2, wherein
the sliding member is resin, and
the sliding member includes an annular portion coaxial with the shaft.

9. The sheet conveying device according to claim 2, wherein the urging member is a tension spring extending along the first direction.

10. The sheet conveying device according to claim 1, wherein the cam has a fan shape and pushes an end of the sheet tray when rotated together with the shaft.

11. An image processing apparatus, comprising:
a sheet conveying device including:
a sheet tray on which one or more sheets can be placed,
a pickup roller with which a sheet can be picked up from the sheet tray,
an elevating mechanism including:
a shaft rotated by a motor, and
a cam attached to the shaft and rotated together with the shaft to raise and lower the sheet tray with respect to the pickup roller, and
a load applying mechanism configured to contact the shaft and apply a load thereto; and
a processor configured to perform image processing for an image formed on a sheet conveyed by the sheet conveying device.

12. The image processing apparatus according to claim 11, wherein the load applying mechanism includes:
a sliding member that contacts the shaft and is slidable along the shaft, and
an urging member configured to urge the sliding member toward a first direction crossing a rotation axis of the shaft.

13. The image processing apparatus according to claim 12, further comprising:
a side cover for covering the motor, the elevating mechanism, and the load applying mechanism, wherein
the urging member is disposed along an inner surface of the side cover.

14. The image processing apparatus according to claim 13, wherein the urging member is attached to the inner surface of the side cover.

15. The image processing apparatus according to claim 13, wherein the load applying mechanism further includes an adjustment member to which the urging member is attached, the adjustment member being movable along the side cover.

16. The image processing apparatus according to claim 15, wherein
the side cover has a hole, and
the adjustment member includes:
a plate movable along an outer surface of the side cover, and
a claw extending from the plate through the hole, the urging member being attached to the claw.

17. The image processing apparatus according to claim 13, wherein
one end of the urging member is connected to the sliding member, and
the load applying mechanism further includes an adjusting device connected to the other end of the urging member, the adjusting device being movable along the inner surface of the side cover.

18. The image processing apparatus according to claim 12, wherein
the sliding member is resin, and
the sliding member includes an annular portion coaxial with the shaft.

19. The image processing apparatus according to claim 12, wherein the urging member is a tension spring extending along the first direction.

20. The image processing apparatus according to claim 11, further comprising:
a housing, wherein
the sheet tray is a manual feed tray that can be stored in the housing.

* * * * *